No. 682,191. Patented Sept. 10, 1901.
W. H. HASLETT.
APPARATUS FOR LINING CASKS, &c.
(Application filed Jan. 19, 1901.)
(No Model.)
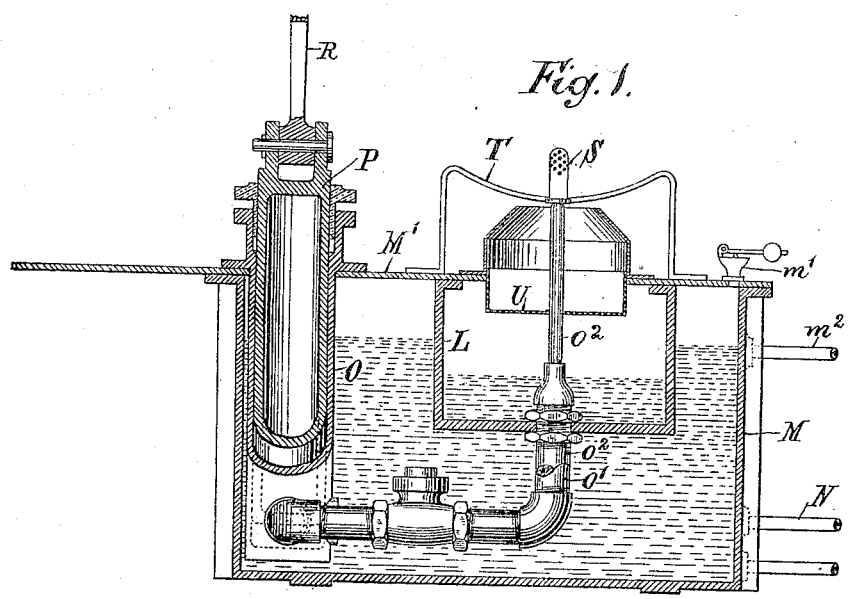

UNITED STATES PATENT OFFICE.

WILLIAM HENRY HASLETT, OF KESTON, ENGLAND, ASSIGNOR OF ONE-HALF TO HERBERT SAMUEL RUSSELL, OF LONDON, ENGLAND.

APPARATUS FOR LINING CASKS, &c.

SPECIFICATION forming part of Letters Patent No. 682,191, dated September 10, 1901.

Application filed January 19, 1901. Serial No. 43,899. (No model.)

*To all whom it may concern:*

Be it known that I, WILLIAM HENRY HASLETT, engineer, a subject of the Queen of Great Britain, residing at Phoenix House, Keston, in the county of Kent, England, have invented certain new and useful Apparatus for Lining Casks, Barrels, and the Like Vessels, of which the following is a specification.

This invention relates to apparatus for lining casks, barrels, and the like vessels with paraffin-wax or other air and water tight material or composition of the kind wherein the lining material is kept fluid in a tank and ejected therefrom under pressure into the cask or vessel.

The object of this invention is to simplify the construction of the lining-material tank, so as to render same more easy of manipulation and better adapted to perform its function than when constructed as heretofore.

In the accompanying drawings, Figure 1 is a sectional side elevation, and Fig. 2 is an end elevation, of my improved apparatus.

The same parts where they occur are lettered to correspond in both figures.

The wax or other lining material is contained in a tank L, connected by a steam-tight joint to an outer vessel M, through the sides or cover of which passes a pipe N, conveying steam from any suitable source and discharging near the bottom of the outer vessel M. A suitable quantity of water fed in through the inlet-pipe $m^2$ is kept in the outer vessel M, beneath the surface of which water the outlet end of the steam-pipe N discharges, so that the tank L is always surrounded by the vapor produced from the water by the live steam entering through the pipe N. The outer vessel M is fitted with a suitable cock $m$ to draw off excess of water produced by condensation and with an escape-valve $m'$ to blow off when a prearranged pressure is developed in the water vessel. By this means I insure that the wax in the tank L is kept at a practically uniform temperature.

Secured to the cover M' of the vessel M and inside thereof is a force-pump O, the plunger P of which is operated from outside the vessel by means of the plunger-rod R, said pump being fitted with inlet and outlet pipes O' and $O^2$, having clack-valves. The pump inlet-pipe O' opens communication between the lining-material tank L and the pump O, and the pump outlet-pipe $O^2$ passes up through the bottom of said tank L and is fitted at its upper end with a perforated nozzle S, through which the wax or other lining material is ejected. Around or adjacent to said nozzle are mounted racks T to receive the barrels to be lined. The surplus material draining out of the barrels falls onto a perforated dish or strainer U, surrounding the ejector or outlet pipe $O^2$, and falls thence into the tank L.

Having fully described my invention, what I claim, and desire to secure by Letters Patent, is—

In apparatus of the kind indicated, a vessel for containing the lining material, comprising a tank secured in an outer vessel for containing water, a steam-pipe opening near the bottom of said outer vessel, a force-pump located in said outer vessel and operated from outside thereof, an inlet-pipe leading from the tank to the pump and an outlet-pipe leading from the pump to a discharge-nozzle outside the cover, and valves in said pipes, substantially as described.

WILLIAM HENRY HASLETT.

Witnesses:
G. D. NEVILLE,
WALTER J. SKERTEN.